Patented June 9, 1925.

1,540,968

UNITED STATES PATENT OFFICE.

PERCY WAENTIG AND RICHARD ZIEGENBALG, OF DRESDEN, GERMANY; SAID RICHARD ZIEGENBALG ASSIGNOR TO SAID WAENTIG.

TREATMENT OF VEGETABLE FIBERS AND THE MANUFACTURE OF CELLULOSE BY THE CHLORINATION PROCESS.

No Drawing.  Application filed June 12, 1924.  Serial No. 719,581.

*To all whom it may concern:*

Be it known that we, PERCY WAENTIG and RICHARD ZIEGENBALG, both citizens of the German Republic, and residing at Dresden, Saxony, German Republic, have invented certain new and useful Improvements in the Treatment of Vegetable Fibers and the Manufacture of Cellulose by the Chlorination Process, of which the following is a specification.

This invention has reference to a process of manufacturing wood pulp or cellulose by reacting on vegetable fibers with chlorine and it is particularly intended to more securely eliminate the tendency of weakening of the fiber and to facilitate and generally improve the process of manufacture. It is well known that wood and similar materials may be treated with chlorine with a view of facilitating and effecting the removal of the incrusting substances. This treatment with chlorine has been generally combined with a preliminary treatment with dilute acid at higher temperatures. In accordance with this invention the treatment with acid is effected at the ordinary temperature, and a highly superior product is thereby obtained from all kinds of vegetable fibers suitable for the manufacture of cellulose and containing incrusting substances, such as wood, straw, corn stalks, husks, sugar cane refuse or the like. After this acid treatment chlorine is caused to act in the usual manner. In order to carry out the process within a reasonable time the acid should, of course, be of a suitable strength to be determined by experiments.

In the practice of our invention we preferably proceed by taking vegetable fibers containing incrusting substances, such as wood, straw or the like, after having reduced them in any suitable manner to chips or the like, in a fresh condition, containing sufficient water or by treating such material when in a dry condition so as to impart thereto a certain percentage of moisture by steaming the material or otherwise, a percentage of say from 30 to 60 per cent of moisture having been found most acceptable, and by then passing chlorine into such moist material. By the action of chlorine upon the incrusting substances and upon the fiber hydrochloric acid is formed which is dissolved in the comparatively small amount of water present to form aqueous hydrochloric acid which on an average has been shown to possess a concentration of from about 20 to 30 per cent HCl, as appears from the experiments of Heuser and Sieber (see Zeitschrift f. angewandte Chemie, vol. 28, (1913) page 801 and following) and of Cross and Bevan.

*Example 1.*—200 pounds of wood in the disintegrated condition are treated in a closed container, an autoclave with acidproof lining for instance, with 1000 pounds of hydrochloric acid of 29% HCl or with 1000 pounds sulphuric acid of 40% $H_2SO_4$ for some hours, for instance for from 2 to 6 hours. The container may be operated under reduced pressure. Upon the termination of the acid treatment chlorine is introduced, there being no necessity in most cases of removing the acid. The products of chlorination are then removed by washing with water and treatment with an alkaline liquid, with sodium hydrate solution for instance, and subsequent final washing.

*Example 2.*—400 pounds of wood chips are steamed, until the wood possesses a total contents of moisture of about 200 pounds. This mass is treated with chlorine gas under ordinary pressure for about an hour, is then allowed to rest for about four hours, and is then again treated with chlorine for two hours. The chlorinated product is then treated in the usual manner with water, alkali liquor, and then again with water for the purpose of removing the incrusting substances.

*Example 3.*—400 pounds of wood in the comminuted condition and with a contents of moisture of about 200 pounds are treated with chlorine for 3 to 5 hours. Then wash as before.

By the action of chlorine upon the vegetable fibers heat is generated. Excess of heat, however, should be avoided so as to obviate the possibility of injuring the fiber, and in case too much heat should be generated in the chlorine treatment cooling should be resorted to. This may be effected in any suitable manner, by the ordinary water jackets, refrigerating coils and the like. In case the material has been mixed with sufficient liquid to allow it to flow or to be forced through pipes, it may be cooled from the outside, while being caused to pass through pipes.

In the case of weakly moistened vegetable fibers, as in the examples 2 and 3, the chlorine may also be diluted by gases of relatively inert behavior for the process, such as air, so as to produce thereby a retardation and a control of the generation of heat.

The invention has been hereinbefore described in its broad aspects only, and it should, of course, be understood, that it is not restricted to any particular manner of procedure, kind of digester, manner of disintegration or other concomitant features, but changes and modifications may occur with varying conditions of application, and without deviating from the spirit of the invention, as particularly set forth in the claims hereunto appended.

What we claim is:—

1. In the process of manufacturing cellulose by the chlorination process the step of treating the fibers with an acid before the treatment with chlorine, and at ordinary temperature.

2. The process of treating vegetable fibers and producing cellulose therefrom which consists in disintegrating the fibers, adding approximately half their weight of water to the fibers, acidifying them, at ordinary temperature, allowing them to remain in the acidified condition, treating them with chlorine and cooling them during the treatment.

3. The process of treating vegetable fibers, and producing cellulose therefrom, which consists in moistening the fibers, acidifying the fibers with dilute hydrochloric acid, allowing them to remain with the acid until sufficiently saturated, treating them with chlorine, and cooling them during the treatment, and finally washing with water and alkaline solutions.

4. The process of treating vegetable fibers and producing cellulose therefrom, which consists in comminuting said fibers, dampening said fibers sufficiently to produce approximately 20 to about 30 per cent dilute hydrochloric acid by subsequent chlorination of said fibers at ordinary temperature, then chlorinating said fibers and cooling them during the chlorine treatment, and thereby preventing increase of pressure beyond the ordinary pressure, and washing and removing the acid from said fibers.

5. The process of treating vegetable fibers, and producing cellulose therefrom, which consists in moistening the fibers, producing about 20 to about 30 per cent dilute hydrochloric acid upon and within said fibers by introducing chlorine gas at ordinary temperatures, allowing said fibers to remain with the acid until sufficiently acidified and saturated, treating them with chlorine and cooling them during the chlorine treatment, and finally washing the fibers with water and alkaline solutions.

6. The process of treating vegetable fibers, and producing cellulose therefrom, which consists in steaming said fibers, causing them to contain about half their weight of moisture, treating them with a mixture of chlorine with an inert gas at ordinary temperature and pressure, allowing them to become saturated and digested with the acid products of chlorination, and repeating the chlorinating treatment, washing with water and an alkaline solution.

In testimony whereof we have affixed our signatures in presence of two witnesses.

PERCY WAENTIG.
RICHARD ZIEGENBALG.

Witnesses:
 HANS BRINKE,
 T. CROEBER.